(12) United States Patent
Hacker et al.

(10) Patent No.: US 9,895,757 B2
(45) Date of Patent: Feb. 20, 2018

(54) REAMER

(71) Applicant: Kennametal Inc., Latrobe, PA (US)

(72) Inventors: Michael Hacker, Nürnberg (DE); Sebastian Kunschir, Winklam (DE); Armin Zimmermann, Oberviechtach (DE); Xaver Spichtinger, Oberviechtach (DE); Wolfgang Lang, Wernberg-Köblitz (DE); Michaela Götz, Tännesburg (DE); Heinrich Manner, Guteneck (DE)

(73) Assignee: KENNAMETAL INC, Latrobe, PA (US)

( * ) Notice: Subject to any disclaimer, the term of this patent is extended or adjusted under 35 U.S.C. 154(b) by 0 days.

(21) Appl. No.: 15/171,543

(22) Filed: Jun. 2, 2016

(65) Prior Publication Data

US 2016/0354849 A1  Dec. 8, 2016

(30) Foreign Application Priority Data

Jun. 5, 2015  (DE) .................. 10 2015 108 902

(51) Int. Cl.
*B23D 77/00* (2006.01)
*B23D 77/12* (2006.01)
*B23D 77/02* (2006.01)

(52) U.S. Cl.
CPC ............ *B23D 77/12* (2013.01); *B23D 77/02* (2013.01); *B23D 77/025* (2013.01); *B23D 2277/02* (2013.01); *B23D 2277/061* (2013.01); *B23D 2277/245* (2013.01); *B23D 2277/2464* (2013.01); *B23D 2277/34* (2013.01); *B23D 2277/44* (2013.01); *Y10T 408/89* (2015.01)

(58) Field of Classification Search
CPC ...... B23D 77/00; B23D 77/02; B23D 77/025; B23D 2277/02; B23D 2277/061; B23D 2277/245; B23D 2277/2442; B23D 2277/2464; B23D 2277/2435; B23D 2277/34; Y10T 408/89–408/90993
USPC .................................. 408/199–233, 117–119
See application file for complete search history.

(56) References Cited

U.S. PATENT DOCUMENTS

| | | | | |
|---|---|---|---|---|
| 124,570 A | * | 3/1872 | Gunn ..................... | B23G 5/06 408/218 |
| 351,482 A | * | 10/1886 | Almond ................. | B23B 51/05 408/186 |
| 352,829 A | * | 11/1886 | Mansfield ............... | B23B 51/00 279/16 |

(Continued)

FOREIGN PATENT DOCUMENTS

| | | | | |
|---|---|---|---|---|
| CN | 102059399 A | | 5/2011 | |
| GB | 816369 A | * | 7/1959 | ............. A23N 15/10 |
| GB | 1195299 A | * | 6/1970 | ............. B23D 77/02 |

OTHER PUBLICATIONS

Feb. 10, 2016—First Office Action—K-06004-DE-NP.

*Primary Examiner* — Daniel Howell
*Assistant Examiner* — Nicole N Ramos
(74) *Attorney, Agent, or Firm* — Matthew S. Bedsole

(57) ABSTRACT

A reamer has a basic tool body made of hard metal (12) and a plate-like cutting insert (18) inserted into a recess (28) at the front. The cutting insert (18) is at least partially made of polycrystalline diamond, its cutting edges (20) situated axially offset relative to the cutting edges (30) on the basic tool body (12), thus engaging with the workpiece later.

12 Claims, 1 Drawing Sheet

(56) References Cited

U.S. PATENT DOCUMENTS

| | | | | | |
|---|---|---|---|---|---|
| 362,934 | A | * | 5/1887 | Champion | B23B 51/108 279/86 |
| 376,501 | A | * | 1/1888 | Almond | B23G 1/22 408/203 |
| 395,909 | A | * | 1/1889 | Langlands et al. | B23G 5/06 408/222 |
| 1,478,451 | A | * | 12/1923 | Mullin | B23B 51/04 408/171 |
| 2,303,487 | A | * | 12/1942 | Miller | B23D 77/00 408/200 |
| 2,369,273 | A | * | 2/1945 | Bakewell | B23D 77/00 407/31 |
| 2,479,136 | A | * | 8/1949 | Schade | B23D 77/00 408/223 |
| 3,412,733 | A | * | 11/1968 | Ross | A61B 17/1666 408/223 |
| 4,461,602 | A | * | 7/1984 | Zettl | B23C 5/2213 407/40 |
| 5,443,337 | A | * | 8/1995 | Katayama | B23B 27/146 407/118 |
| 2008/0193234 | A1 | * | 8/2008 | Davancens | B23B 35/00 408/1 R |
| 2011/0176879 | A1 | * | 7/2011 | Jonker | B22F 7/062 408/144 |
| 2014/0227034 | A1 | * | 8/2014 | Inglis | B23B 51/08 405/36 |

* cited by examiner

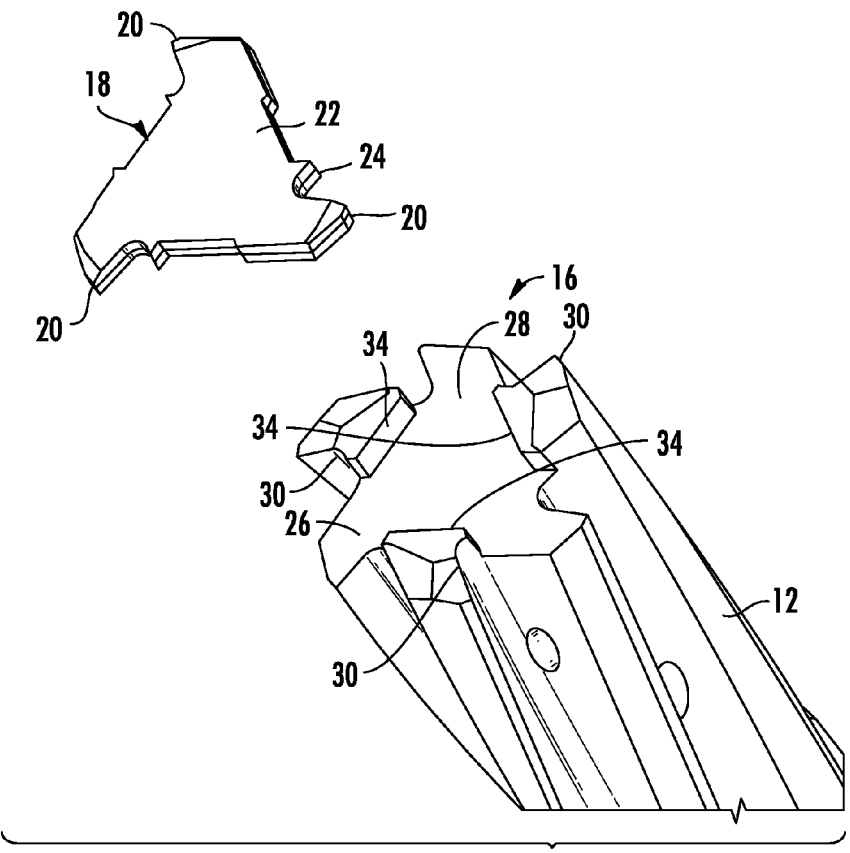
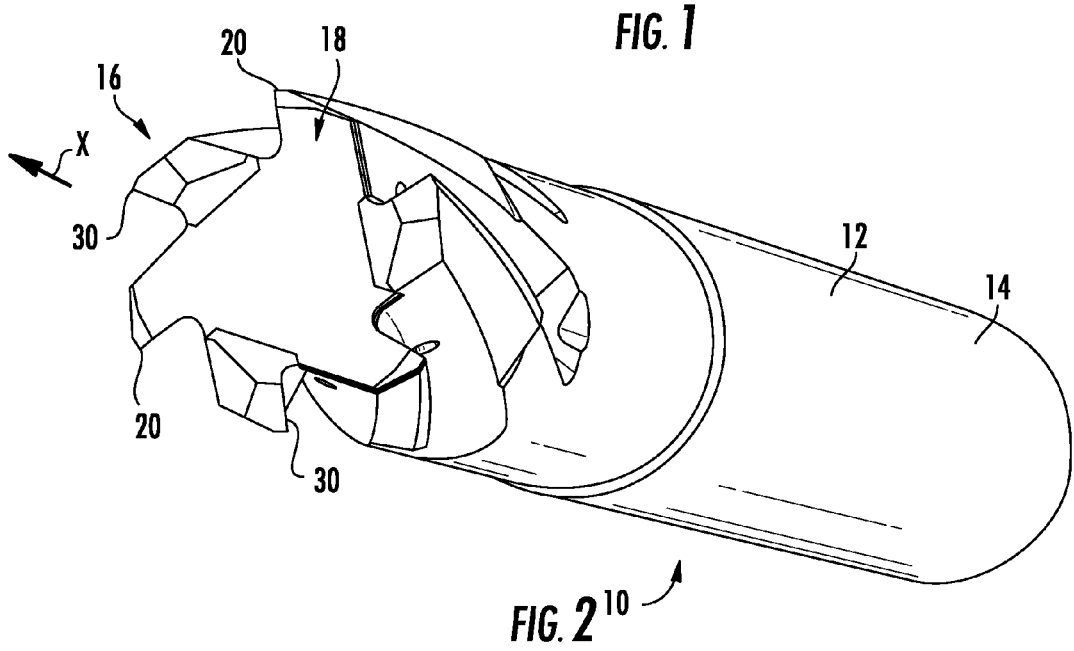

REAMER

RELATED APPLICATION DATA

The present application claims priority pursuant to 35 U.S.C. § 119(a) to German Patent Application Number 1020151089025 filed Jun. 5, 2015 which is incorporated herein by reference in its entirety.

FIELD

The invention relates to a reamer that is used at the front end to enlarge previously drilled openings, particularly in holes such as valve guides in engine cylinder heads, to a desired dimension with high accuracy.

BACKGROUND

Such reamers are known from CN102059399A, for example. These reamers have, for example, a free end at the front facing the workpiece, said end having a separate head that carries the cutting edges and can be made of a harder material than the basic tool body material. Furthermore, there are reamers that have a plurality of separate cutting inserts at a distance from the front end on their circumferential section, said cutting inserts each being plate-like and inserted into longitudinal slots that essentially run along the length of the basic tool body.

Various cutting materials, including, for example, hard metals, are used for the cutting edges. Moreover, theoretically polycrystalline diamond is an advantageous cutting material. However, this has the considerable disadvantage that high operating temperatures can result in graphitization. This occurs particularly in the machining of ferrous materials.

SUMMARY

It is therefore the object of the invention to create a reamer in which cutting edges made of polycrystalline diamond are present, these cutting edges, however, not being subjected to excessively high temperatures while in use, i.e., that these temperatures do not occur on the cutting edges made of polycrystalline diamond. Furthermore, this reamer is intended to be especially easy to manufacture and of high accuracy.

This objective is achieved by a reamer according to claim 1.

The invention provides that the front end, which penetrates into the workpiece, has a face with an axial recess into which a plate-like cutting insert at least partially made of polycrystalline diamond is inserted. In contrast to the elongated cutting inserts that are typically inserted laterally, this cutting insert is located at the end face and has a plurality of radially projecting cutting edges. However, these cutting edges do not engage with the workpiece first. The hard metal cutting edges, which are integrally formed with the basic tool body, engage with the workpiece first in the feed direction and increase its diameter. Only after this initial machining do the cutting edges of the plate-like cutting insert made of polycrystalline diamond come into contact with the workpiece. This diamond cutting edge must then only increase the diameter by a few hundredths of a millimeter such that the hard metal cutting edges have done the preparatory work, so to speak, and the polycrystalline cutting edges only need to remove relatively little material from the workpiece, as a result of which the temperature increase during operation is very low. The cutting edges made of polycrystalline diamond do not reach the critical graphitization temperature when this method is used.

The reamer according to the invention has several other advantages. Because the polycrystalline diamond plate has a plurality of cutting edges, it is very easy to manufacture and also easy to attach to the basic tool body. Furthermore, the costs for this plate are relatively low compared with the numerous plates that are used on a reamer in the prior art. The invention can be achieved with a single plate and produces several cutting edges on the circumference with this cutting insert. Lastly, it is also a great advantage that the cutting insert made of polycrystalline diamond is attached to the face. As a result, the axial distance from the hard metal cutting edges is relatively small. This in turn means that blind bores or stepped bores can be reamed until just before the bottom of the bore or the shoulder, whereas there is a relatively clear distance from the front end of the reamer in the prior art having the laterally protruding, wing-like, longitudinally extending cutting inserts. The necessary feed path is also reduced to a minimum.

The hard metal cutting edges and the cutting edges made of polycrystalline diamond, hereinafter referred to as diamond cutting edges for the sake of simplicity, alternate circumferentially. However, a ratio other than 1:1 is also possible between the two types of cutting edges, such as 2:3 or 1:2. This can be useful for harmonizing the operating life of the two types of cutting edges.

The recess at the front side preferably runs perpendicular to the longitudinal axis, i.e., it has a bottom surface against which bears the cutting insert.

The cutting insert itself, which is plate-like, runs perpendicular to the longitudinal axis of the reamer according to one embodiment of the invention.

The invention permits a design for reamers in small diameter ranges up to less than 5 mm, the possible number of teeth according to the prior art being exceeded. The difference in diameter between the hard metal cutting edges and the diamond cutting edges is usually less than ⅒ mm, as one embodiment of the invention provides.

Alternatively, the cutting material of the cutting plate can be made not of polycrystalline diamond, but of a material that is harder than the hard metal of the hard-metal cutter.

Further features and advantages of the invention are derived from the following description and from the following drawings to which reference is made.

BRIEF DESCRIPTION OF THE DRAWINGS

FIG. 1 shows an exploded view of the reamer according to the invention, and

FIG. 2 shows the reamer according to FIG. 1 in a completely manufactured state.

DETAILED DESCRIPTION

Both FIG. 1 and FIG. 2 show a reamer 10 that has a basic tool body 12 made of hard metal. The basic tool body 12 has a clamping end 14 with which it can be inserted into a receptacle of a tool machine and rotated thereby.

There is a so-called front end 16 opposite of the clamping end. A plate-like cutting insert 18 is attached at the front side of this front end 16. The cutting insert 18 has a plurality of cutting edges 20 made of polycrystalline diamond distributed around the circumference.

The cutting insert itself is a composite component with an upper layer or plate 22 made of the polycrystalline diamond and an underlying carrier plate 24 made of hard metal. The two plates 22, 24 are sintered together and form a unit.

The holder 12 in turn has a recess 28 on its face 26 at the front end 16 that is flat and aligned at a right angle to the longitudinal axis of the reamer.

A plurality of fingers resembling the points of a crown protrude across from this recess 28, each of the fingers forming the end of the entire reamer that axially projects the farthest forward. Hard metal cutting edges 30 are formed on the outer circumference of these, in this case three points or fingers, which are an integral part of the basic tool body and therefore made of hard metal. These hard metal cutting edges are on a diameter relative to the center axis and rotational axis of the reamer that is minimally smaller than the diameter on which the diamond cutting edges 20 are situated.

At the front end 16 with the carrier plate 24 pointing forward, the cutting insert 18 is placed ahead on the base surface of the recess 28, which is also indicated by the arrow of reference number 28 in FIG. 1, and firmly connected to the basic tool body made of hard metal.

The center-facing, i.e. radially inward facing, surfaces 34 of the axially protruding crown-like or finger-like projections that form the hard metal cutting edges 30 are rough alignment surfaces for the insertion of the cutting insert 18.

In the completed design of the reamer shown in FIG. 2, the hard metal cutting edges 30 are in front of the diamond cutting edges 20 in the axial feed direction X such that they come into contact with the workpiece first and cut it to a larger diameter. Only afterwards do the cutting edges 20 engage with the workpiece. However, because the cutting edges 20 are situated on a diameter that is minimally larger, and preferably only less than $\frac{1}{10}$ mm larger, than the diameter arranged coaxially herewith, on which the hard metal cutting edges 30 are situated, the cutting capacity that must be provided by the diamond cutting edges is very low, as a result of which the heat produced on the diamond cutting edges 20 is also very low.

The basic tool body can, of course, be composed of several parts, for example a hard metal part near the front end 16 and a tougher, cheaper metal in the region of the clamping end 14.

As is evident from FIGS. 1 and 2, the basic tool body 12 has a front end with a crown-like design, the cutting edges, along with the protruding fingers on which they are formed, forming the points of the crown.

The cutting insert 18 in turn has a star-shaped, but plate-like design. The diamond cutting edges 20 form the points.

To perfectly center the cutting edges 20 relative to the cutting edges 30, the cutting edges 20 are finish-ground only after the cutting edge 18 has been brazed on such that it is also centered relative to the center axis of the basic tool body 12.

The invention claimed is:

1. A reamer defining a longitudinal axis and comprising:
   a basic tool body at least partially made of hard metal, the basic tool body having a clamping end and a front end opposite the clamping end that penetrates into the workpiece, the front end having a front side and hard metal cutting edges that protrude axially around a circumference of the front end, the front side having an axial recess into which a cutting insert at least partially made of polycrystalline diamond is inserted;
   wherein the cutting insert hag has two opposing flat surfaces and a plurality of radially protruding diamond cutting edges;
   wherein the hard metal cutting edges are arranged such that, in a cutting feed direction, cutting first starting from hard metal cutting edges at the front end, followed by the diamond cutting edges; and
   wherein the hard metal cutting edges have a smaller cutting diameter than the diamond cutting edges.

2. The reamer according to claim 1, wherein the hard metal cutting edges and the diamond cutting edges alternate circumferentially.

3. The reamer according to claim 1, wherein the recess has a base surface that is perpendicular to the longitudinal axis of the reamer.

4. The reamer according to claim 1, wherein the front end of the basic tool body has a plurality of axially protruding fingers on which the hard metal cutting edges are formed.

5. The reamer according to claim 1, wherein the cutting insert has a polygonal design with radially outer points on which the diamond cutting edges are formed.

6. The reamer according to claim 1, wherein the cutting insert is brazed to the basic tool body.

7. The reamer according to claim 1, wherein the cutting insert is a composite component having a front layer of polycrystalline diamond and an adjacent hard metal carrier layer.

8. The reamer according to claim 1, wherein the cutting insert has at least two diamond cutting edges.

9. The reamer according to claim 1, wherein the difference in diameter between the diameters on which the hard metal cutting edges and the diamond cutting edges are situated is less than $\frac{1}{10}$ mm.

10. The reamer according to claim 1, wherein the cutting insert is arranged with the flat surfaces being perpendicular to the longitudinal axis of the reamer.

11. The reamer according to claim 3, wherein the cutting insert is arranged with the flat surfaces being perpendicular to the longitudinal axis of the reamer.

12. The reamer according to claim 8, wherein the diamond cutting edges are evenly distributed around a circumference of the cutting insert.

* * * * *